Feb. 2, 1971 B. GULISTAN 3,560,132
ARRANGEMENT FOR CAPTIVE SCREW
Filed Nov. 22, 1968 2 Sheets-Sheet 1

INVENTOR
BULENT GULISTAN
BY
ATTORNEYS

Feb. 2, 1971  B. GULISTAN  3,560,132
ARRANGEMENT FOR CAPTIVE SCREW
Filed Nov. 22, 1968  2 Sheets-Sheet 2

INVENTOR.
BULENT GULISTAN
BY
ATTORNEYS

3,560,132
ARRANGEMENT FOR CAPTIVE SCREW
Bulent Gulistan, Malibu, Calif., assignor to Deutsch Fastener Corp., Los Angeles, Calif., a corporation of California
Continuation-in-part of application Ser. No. 697,361, Jan. 12, 1968, which is a division of application Ser. No. 590,601, Oct. 31, 1966. This application Nov. 22, 1968, Ser. No. 778,262
The portion of the term of the patent subsequent to Mar. 24, 1987, has been disclaimed
Int. Cl. F16b 41/00
U.S. Cl. 151—69      5 Claims

ABSTRACT OF THE DISCLOSURE

A captive screw arrangement including a sleeve through which is extended a screw blank, after which the portion of the shank projecting beyond the sleeve is provided with screw threads of a larger major diameter than the bore of the sleeve. A second bore of larger diameter is included, resulting in a thin-walled portion enabling a flange to be bent outwardly for attaching the sleeve to a workpiece. The interior of the sleeve beyond the first bore may be of sufficient length to allow retraction of the screw shank, and a third bore also may be provided to give the intermediate portion of the sleeve a thicker wall and greater strength than that at the thin-walled end.

REFERENCE TO PARENT APPLICATIONS

This is a continuation-in-part of my copending patent application Ser. No. 697,361, filed Jan. 12, 1968, and now abandoned which is a division of patent application Ser. No. 590,601, filed Oct. 31, 1966, for Arrangement for Captive Screw and now abandoned.

BACKGROUND OF THE INVENTION

Field of the invention

This invention pertains to a fastener of the type where a screw extends through a receptacle which is adapted for attachment to a workpiece.

The prior art

Frequently, captive screw devices are complex items including involved arrangements that hold the threaded screw to the receptacle to prevent separation of these parts. As such, they are expensive to manufacture, yet still often may permit the screw to become separated from the receptacle. Other problems center around the attachment of the receptacle to the workpiece. This also may be complicated and not fully reliable. Conventional captive screws may become loosened and separated from the workpiece under vibrational and other loads imposed upon them.

SUMMARY OF THE INVENTION

According to this invention, a much simpler captive screw is produced with a minimum of time and expense, yet the device is of superior performance capabilities. The present invention includes a receptacle in the form of a sleeve having a bore through which the shank of the screw extends. The shank is threaded after it has been passed through the bore, with threads being rolled on the outer end of the shank beyond the sleve. These threads are rolled to a larger outside diameter than the diameter of the opening through the sleeve, so that the screw cannot move axially more than a limited distance due to the interference between the threads and the sleeve. The head of the screw, of course, prevents movements in the opposite direction. Thus, the screw is permanently retained by the receptacle, which operation is acomplished simultaneously with the forming of threads on the shank. In this manner, the threads are made to perform a dual function. The shank of the screw may initially have an enlarged distal end portion where the threads are formed, with an inner part smaller in diameter than the sleeve bore to permit lateral floating of the screw.

Usually, the sleeve is fastened to the workpiece by means of flanges, one of which is preformed and the other of which is bent outwardly when the fastener is inserted through an opening in the workpiece, overlapping the surface of the workpiece to hold the sleeve in place. The sleeve, therefore, is retained by the workpiece while it cooperates with the enlarged threaded portion of the screw to hold the screw to the workpiece for limited axial movement relative thereto.

The bore in the sleeve may include a portion of larger diameter than the threads to allow the threaded shank to be retracted into the sleeve. The portion of larger diameter may be defined by a second bore that also results in a thin-walled end to facilitate the bending of the flange. For greater strength, the sleeve may have a third and intermediate bore that will receive the threaded shank while providing a thicker wall than at the end of the sleeve.

An object of this invention is to provide an improved simplified captive screw.

Another object of this invention is to provide an arrangement for the rapid and economical manufacture of captive screws.

A further object of this invention is to provide a captive screw in which the threads on the shank act both as the attaching means and as the means for holding the screw against movement in one direction.

An additional object of this invention is to provide a captive screw in which the screw is permanently, securely and nonremovably retained by the receptacle.

Yet another object of this invention is to provide a captive screw in which the threaded end of the screw is retractable into the sleeve, while the sleeve is provided with a peripheral wall of sufficient thickness to give it adequate strength.

These and other objects will become apparent from the following detailed description taken in connection with the accompanying drawing.

DESCRIPTION OF THE PREFERRED EMBODIMENTS

Figure 1:
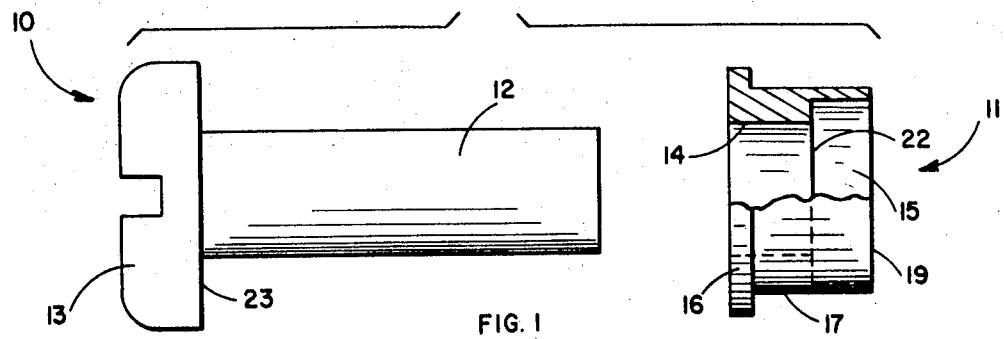
FIG. 1 is an exploded side elevational view, partially in section, of the components of the fastener following the initial stage of manufacture.

The fastener of this invention is in two parts, one of which is the screw 10 and the other a tubular receptacle 11. As illustrated in FIG. 1, the screw 10 first is formed as a blank having a straight cylindrical shank 12 at one end of which is a head 13 of any desired configuration. The receptacle 11 is constructed as a sleeve or collar which is shorter axially than the shank 12 of the screw. The receptacle has an axial bore 14 extending inwardly from one end, joining a remaining enlarged bore portion 15 that extends to the opposite end. At the end of the receptacle 11 adjacent the bore 14 is a radially outwardly projecting flange 16. The receptacle 11 for the remainder of its length exteriorly has a cylindrical surface 17 of constant diameter. Moreover, the wall of the receptacle is continuous, with no slots or openings interrupting its continuity.

Figure 2:
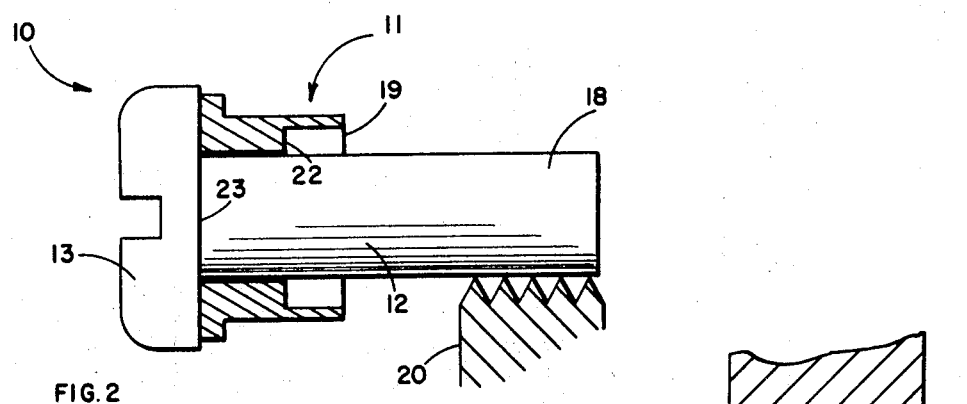
FIG. 2 is a longitudinal sectional view of the fastener with the screw blank associated with the receptacle preparatory to the forming of threads on the shank of the screw.

After the two components of the fastener have been formed to the condition of FIG. 1, the shank 12 is inserted into the bores 14 and 15, as illustrated in FIG. 2. The bore 14 is dimensioned to receive the shank rather closely with a sliding fit, so that the screw member 10 can be both rotated and moved axially relative to the receptacle 11. There is a clearance between the wall of the shank 12 and the interior surface of the receptacle at the larger portion 15 of the bore. With the shank 12 being longer than the receptacle, it has an end portion 18 projecting beyond the outer edge 19 of the receptacle 11 when the head 13 is positioned adjacent the flange 16.

After the screw 10 has been extended through the receptacle 11 in the manner shown in FIG. 2, threads then are formed on the outer end portion 18 of the shank 12. This is accomplished by a rolling operation. A die 20 of conventional design is moved laterally relative to the screw blank to bear against the end portion 18 of the shank 12. Then, upon relative rotation of the shank and die, threads 21 are formed on the end of the screw 10.

When the threads are rolled on the shank 12 in this manner, they are caused to project outwardly beyond the surface of the shank 12, providing a greater overall diameter at the end portion 18. Consequently, the major diameter of the threads 21 is larger than the diameter of the shank 12 inwardly of the threads. This major diameter also is greater than that of the bore 14 of the receptacle 11. As a result, the threads 21 hold the screw 10 to the receptacle 11. Once the threads 21 have been rolled on the end portion 18, it becomes impossible to move the screw axially in one direction (to the left as illustrated) more than a limited distance because the threads 21 cannot pass through the bore 14. Instead, the outwardly projecting threads will engage the shoulder 22 between the bores 14 and 15, which thereby stops the screw 10 from movement in that direction. The threads and the shoulder 22, therefore, define an abutment arrangement that limits the movement of the screw relative to the receptacle. Of course, movement in the opposite direction is precluded by the screw head 13, which allows movement only to the point where its undersurface 23 engages the outer face of the flange 16.

Thus, by the simple process of rolling threads on the end of the shank of the screw member following its insertion into the bore of the receptacle, a captive screw is provided. The threads are made to perform a dual function, both holding the screw to the receptacle and providing the means for engagement with the mating threaded opening. By a single operation, therefore, the screw member is completed and the retaining means is formed. The screw is held securely and with permanency to the receptacle. There are no slots or gaps in the receptacle which would weaken its wall and raise the danger of its opening up to allow separation of the screw from the receptacle. The screw and receptacle are held together such that it requires destruction of one or the other in order to separate them. Nevertheless, the screw may move freely through its limited axial distance for engagement with the mating threaded opening.

Figure 3:
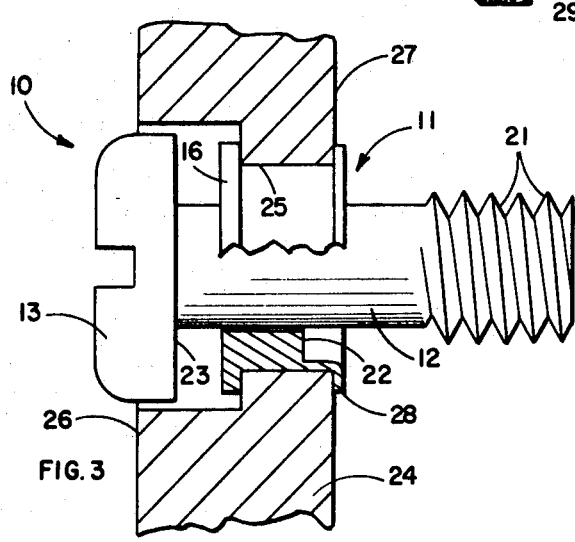
FIG. 3 is a longitudinal sectional view of the completed fastener attached to a workpiece.
Figure 5:
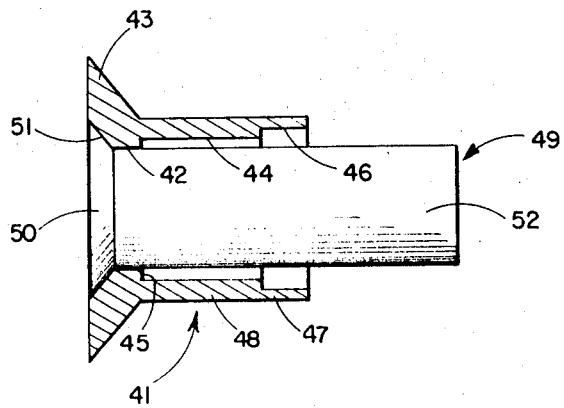
FIG. 5 is a longitudinal sectional view, partially in elevation, of a modified form of the invention in which the intermediate portion of the receptacle wall is made stronger than in the design of FIG. 4, with the screw blank being shown prior to forming the threads.

In use of the captive screw of this invention, the receptacle 11 is attached to a workpiece as indicated in FIG. 3. The workpiece 24 is provided with an aperture 25 dimensioned to receive the cylindrical exterior surface 17 of the receptacle 11. Then the receptacle is inserted through the opening 15 in the workpiece 24, bringing the flange 16 into engagement with the surface 26 of the workpiece adjacent one end of the opening 25. The receptacle 11 is longer than the thickness of the workpiece 24 at the opening 25 so that the end of the receptacle projects beyond the surface 27 of the workpiece. At this time, the projecting end of the receptacle is bent outwardly, as shown in FIG. 3, to provide a radially extending flange 28 that overlaps the workpiece surface 27 at the other end of the opening 25. The provision of the enlarged bore portion 15 through the receptacle 11 results in a thinner wall at that end of the receptacle, which facilitates the outward bending to form the flange 28. The attachment of the receptacle to the workpiece, therefore, is also a simple operation, so that, by merely bending a flange outwardly, the receptacle is securely held and retained by the workpiece. The receptacle 11, in turn, cooperating with the threads 21, secures the screw 10 to the workpiece so that it will be engageable with a mating threaded opening and will at all times be in position on the workpiece when the fastener is loosened.

The fastener should be made, as illustrated, with an appreciable length to the bore 14 beyond (to the left of) the shoulder 22. This is to assure that the threads 21 cannot pass the shoulder 22 and allow the screw 10 to escape the receptacle 11, even though an end force is imposed on the shank 12. Such a force may be applied when the screw is being loosened from a mating part, with a portion of the threads engaging the threaded opening in the mating part, while the inner end thread bears against the shoulder 22. If the bore section 14 is short, the effect is only that of a thin flange where the shoulder 22 engages the inner end of the threads 21. The threads 21 then, in some instances, can distort the resulting thin flange and form mating internal threads in it, so that the screw 10 may then be unthreaded completely from the receptacle 11. However, with the bore 14 of appreciable length, this cannot occur as the shoulder 22 becomes relatively thick axially. It has been found that a length of .060 inch is the minimum practical length for the bore portion 14 in typical fasteners having aluminum receptacles.

Figure 4:
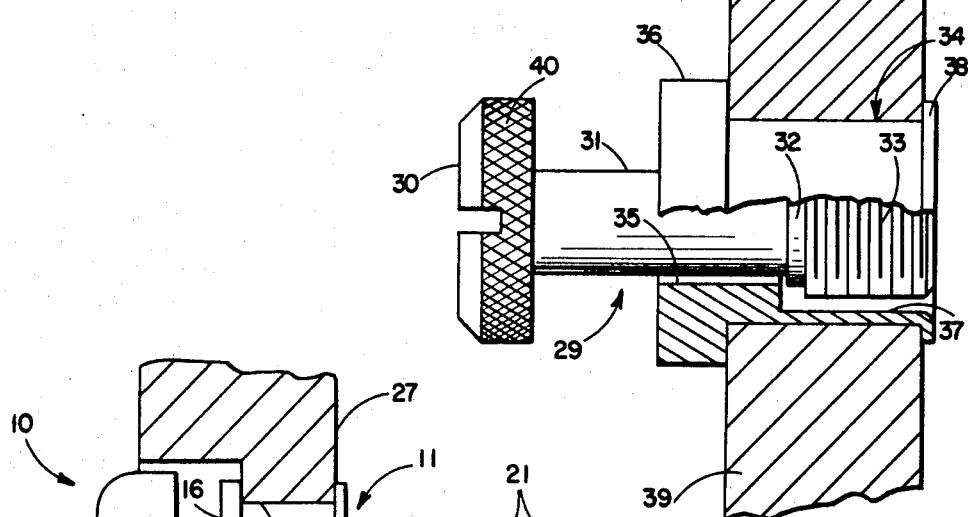
FIG. 4 is a longitudinal sectional view, partially in elevation, of a modification of the fastener that provides for lateral floating movement of the screw and allows full retraction of the threaded end of the screw into the receptacle.

The embodiment of FIG. 4 is constructed to allow the screw to float laterally relative to the receptacle while still retaining the screw against movement out of the receptacle. This floating movement often is advantageous where possible misalignment of the threaded opening in the adjacent part may occur. Also, in the arrangement of FIG. 4, the shank of the screw will retract entirely within the receptacle, so that a flush surface is provided. In certain instances it is desired to be certain that the shank of the fastener will not project beyond the end of the receptacle as this embodiment accomplishes.

The screw 29 of the design of FIG. 4 includes a slotted head 30 from which projects an unthreaded shank portion 31. Outwardly of the shank portion 31 is a section 32 of greater diameter than the part 31. The threads 33 are rolled on the outer portion 32 after the shank has been extended through the receptacle 34. Thus, as before, with the end part 32 projecting beyond the receptacle, the threads 33 are formed on the outer end of the shank.

The receptacle 34 includes a bore 35 adjacent the preformed end flange 36. A counterbore 37 entering from the opposite end is of greater diameter than the bore 35. The device is constructed, therefore, such that the outer part of the shank with the threads 33 thereon is of a diameter such that it cannot pass through the bore 35 at the flange end of the receptacle 34. The threaded portion 33, however, can enter the larger counterbore 37.

The length of the counterbore 37 is proportioned such that the end threaded section of the shank can fit all the way in the receptacle. Therefore, when the device is installed and the attaching flange 38 is bent outwardly over the workpiece 39, the shank can be withdrawn completely into the receptacle with none of the shank projecting beyond the end of the receptacle. This retraction of the shank may be facilitated by providing a knurled periphery 40 on the head 30 of the screw. In order to compensate for the longer counterbore 37 in this version of the invention so that the receptacle 34 will have adequate strength, the flange 36 is made thicker than the flange 16 in the previously described embodiment.

The shank portion 31 of reduced diameter allows the screw to float laterally relative to the receptacle 34. The portion 31 is somewhat smaller than the diameter of the bore 35, providing a clearance that permits this lateral movement to take place. At the same time, the larger end section of the shank with its rolled threads 33 cannot pass through the bore 35, so that the screw is held to the receptacle. This allows there to be the positive retention of the previously described embodiment, while adding to the versatility of the fastener in permitting it to engage misaligned threaded openings in the adjacent workpiece.

The arrangement of FIGS. 5 through 8 also provides a retractable screw that may be withdrawn entirely within the receptacle. This design is particularly useful for longer fasteners in which the receptacle must fit through thicker panels, providing for greater strength in the receptacle than in the design of FIG. 4.

The receptacle 41 has a relatively small bore portion 42 adjacent the end where the flange or head 43 projects outwardly from the receptacle. In this instance, the flange 43 is frustoconical to provide for a flush installation, but otherwise is equivalent to the flanges 16 and 36 described above. The receptacle 41 includes a second intermediate bore portion 44, providing a radial shoulder 45 between it and the smaller bore section 42. A third and still larger bore 46 results in a thinwalled section 47 at the end of the tubular receptacle. The wall 48 of the receptacle at the intermediate bore 44 is substantially thicker than the wall 47 at the end.

The screw blank 49, in this instance illustrated with a flush head 50 to fit within a frustoconical recess 51 in the receptacle, is positioned in the receptacle so that its unthreaded shank 52 extends through and beyond the end of the receptacle, as before. The shank is dimensioned so that it will slidably fit through the smaller bore section 42 while, of course, clearance is provided at the larger bore sections 44 and 46. With the screw blank positioned as in FIG. 5, the threads 53 then are rolled on the end of the shank 52, providing it with a larger diameter. The parts are proportioned so that the threads 53 have a major diameter sufficiently small to allow the threaded end to enter the intermediate bore section 44. However, the threads 53 have a larger major diameter than that of the end bore 42, and are blocked by the shoulder 45 so that the screw cannot be withdrawn from the receptacle 41 after the threads have been formed. Thus, the screw is retained by the receptacle.

The fastener assembly then is fitted into an opening 54 in a workpiece 55, with the end of the thin-walled portion 47 projecting beyond the surface of the workpiece adjacent the opening 54. The thin-walled section 47 then is bent outwardly substantially at right angles to form a flange 56. This cooperates with the flange 43 on the receptacle in holding the receptacle to the workpiece. This, in turn, retains the screw to the workpiece, with freedom for limited axial movement.

Figure 6:
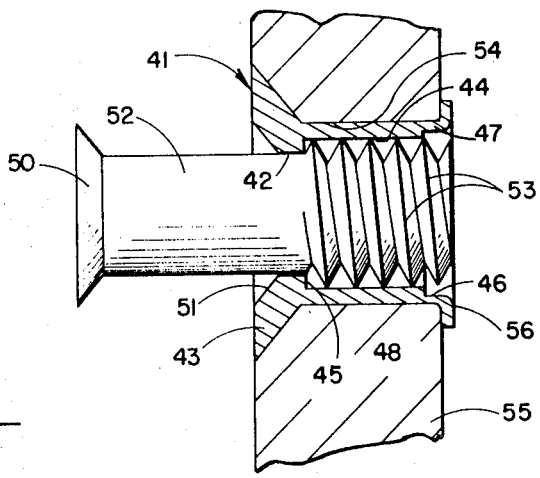
FIG. 6 is a view similar to FIG. 5, but with the threads produced on the end of the shank and withdrawn into the receptacle.
Figure 7:
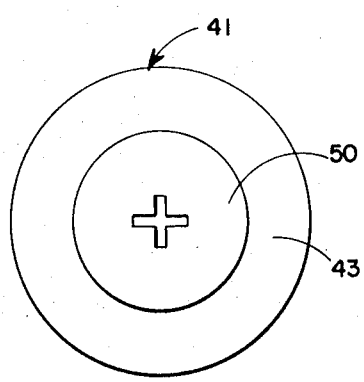
FIG. 7 is an end elevational view of the fastener.
Figure 8:
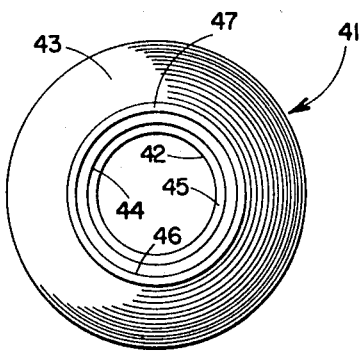
FIG. 8 is an end elevational view of the receptacle prior to receiving the screw blank.

The bore section 44 is made sufficiently deep that the screw shank may be withdrawn entirely into the receptacle 41 so that the screw does not then project beyond the end of the receptacle, as shown in FIG. 6. However, unlike the version of FIG. 4, the provision of three bore sections instead of two permits the intermediate portion of the receptacle to have a thicker wall 48 and, hence, to be stronger. This is important particularly where the receptacle is made relatively long to fit through a thicker panel. When the flange 56 is bent to attach the receptacle to the workpiece, an inwardly directed force is applied to the end of receptacle 41, causing it to be loaded in compression. If the thin-walled section 47 were to extend all the way to the shoulder 45, the receptacle would not in all instances possess adequate resistance to this compression load. Hence, it would become collapsed and distorted when the flange was formed. However, with the provision of the intermediate bore 44 with a resulting thicker wall 48 for the receptacle in its central portion, the receptacle possesses considerably greater strength and can withstand the forces applied to it.

I claim:
1. In combination with a member having an opening therethrough, a captive screw device for securing said member to another part comprising
   a unitary metallic sleeve received in said opening,
      said sleeve having a first flange projecting outwardly therefrom at one end and overlapping a surface of said member,
      said sleeve having a second outwardly bent flange projecting substantially radially outwardly at the opposite end thereof and overlapping another surface of said member,
         whereby said flanges cooperate to hold said sleeve to said member,
      said sleeve having a first cylindrical bore portion of appreciable length adjacent said first flange,
      said sleeve having a second and larger cylindrical bore portion of appreciable length at said opposite end thereof,
         thereby providing said sleeve with a thinner wall thickness at said opposite end thereof for facilitating the outward bending of said second flange,
      said sleeve having a third cylindrical bore portion of appreciable length and of a diameter intermediate the diameters of said first and second bore portions providing said sleeve at said third bore portion with a greater wall thickness than said wall thickness at said opposite end,
         said first and third bore portions being interconnected by a substantially undeflectable shoulder, said sleeve at said third bore portion being received in said opening in said member,
   and a screw,
      said screw having a head adjacent said one end of said sleeve,
         said head being larger in diameter than the diameter of said first bore portion,
      and an integral shank projecting from said head,
         said shank having an unthreaded portion slidably extending through said first bore portion,
            said unthreaded portion being longer than said first bore portion,
         said shank having rolled threads on the distal end thereof beyond said first bore portion,
            said rolled threads having a major diameter greater than the diameter of said first bore portion and less than the diameter of said third bore portion,
            whereby said screw is movable axially relative to said sleeve to retract said rolled threads into said third bore portion, and said rolled threads and said shoulder cooperate to retain said screw to said member.

2. A device as recited in claim 1 in which said third bore portion is of a depth sufficient to permit said distal end to be substantially entirely retracted into said sleeve.

3. A captive screw device comprising a a unitary metallic sleeve, said sleeve having an outwardly projecting exterior flange at one end thereof for engagement with a workpiece, said sleeve having a first bore portion of appreciable length adjacent said flange, said first bore portion being substantially cylindrical throughout its length, said sleeve having a second and larger bore portion of appreciable length at the opposite end thereof, thereby providing said sleeve at said opposite end with a relatively thin wall adapted to be bent outwardly to form a flange cooperating with said first-mentioned flange in holding said sleeve to said workpiece, said sleeve having a third bore portion of appreciable length and of a diameter intermediate the diameters of said first and second bore portions, thereby providing said sleeve at said third bore portion with a wall thickness greater than that at said opposite end, said first and third bore portions being interconnected by a substantially undeflectable shoulder, and a screw, said screw having a head exteriorly of said first bore portion and adjacent said one end of said sleeve, said head being larger transversely than the diameter of said first bore portion, and an integral shank projecting from said head, said shank having an unthreaded portion slidably extending through said first bore portion, said unthreaded portion being longer than said first bore portion, said shank having rolled threads on the distal end thereof beyond said first bore portion, said rolled threads having a major diameter greater than the diameter of said first bore portion and less than the diameter of said third bore portion, whereby said screw is movable axially relative to said sleeve to retract said rolled threads into said third bore portion, and said rolled threads and said shoulder cooperate to retain said screw to said sleeve.

4. A device as recited in claim 3 in which said third bore portion is of a depth sufficient to permit said distal end to be substantially entirely retracted into said sleeve.

5. A device as recited in claim 3 in which said appreciable length of said first bore portion is at least approximately .060 inch, and said sleeve is of aluminum material.

References Cited

UNITED STATES PATENTS

| | | | |
|---|---|---|---|
| 1,251,676 | 1/1918 | MaCaffray | 151—69 |
| 1,883,906 | 10/1932 | Hasselquist | 10—86Cl |
| 2,201,793 | 5/1940 | Sanborn | 151—69 |
| 3,218,906 | 11/1965 | Dupree | 151—69 |
| 3,250,559 | 5/1966 | Sommerfeld | 151—69 |
| 3,255,799 | 6/1966 | Hermovics | 151—69 |

MARION PARSONS, Jr., Primary Examiner

U.S. Cl. X.R.

29—512; 151—41.74